US008356334B2

(12) United States Patent
Yik et al.

(10) Patent No.: US 8,356,334 B2
(45) Date of Patent: Jan. 15, 2013

(54) DATA NETWORK NODE HAVING ENHANCED SECURITY FEATURES

(75) Inventors: James Ching-Shau Yik, Mission Viejo, CA (US); Eric Lin, Hacienda Heights, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 3275 days.

(21) Appl. No.: 09/866,259

(22) Filed: May 25, 2001

(65) Prior Publication Data

US 2003/0208571 A1 Nov. 6, 2003

(51) Int. Cl.
*G06F 7/04* (2006.01)
(52) U.S. Cl. ............... 726/3; 726/2; 380/247; 380/248; 380/249; 380/250; 709/225
(58) Field of Classification Search .................. 709/208, 709/225; 713/162; 726/2, 3; 380/247, 248, 380/249, 250
See application file for complete search history.

(56) References Cited

U.S. PATENT DOCUMENTS

| | | | | |
|---|---|---|---|---|
| 4,893,340 A | * | 1/1990 | Lubarsky et al. | 709/208 |
| 5,996,021 A | * | 11/1999 | Civanlar et al. | 709/238 |
| 6,069,889 A | * | 5/2000 | Feldman et al. | 370/351 |
| 6,870,844 B2 | * | 3/2005 | Tuck et al. | 370/390 |
| 7,065,644 B2 | * | 6/2006 | Daniell et al. | 713/166 |
| 2002/0147916 A1 | * | 10/2002 | Strongin et al. | 713/193 |
| 2002/0156888 A1 | * | 10/2002 | Lee et al. | 709/224 |
| 2003/0014665 A1 | * | 1/2003 | Anderson et al. | 713/201 |

OTHER PUBLICATIONS

Badger, M.R. and Murphy, S.L. Digitial Signature Protection of the OSPF Routing Protocol, 1996 IEEE, pp. 93-102.*

* cited by examiner

*Primary Examiner* — Edan Orgad
*Assistant Examiner* — Roderick Tolentino
(74) *Attorney, Agent, or Firm* — Jackson Walker L.L.P.; Christopher J. Rourk

(57) ABSTRACT

An apparatus and methods for securely forwarding data packets at a data switching node in a data transport network is provided. The data switching node maintains a switching database of switching entries. Each switching entry has a modification protection feature preventing its modification when activated. Dynamic topology discovery of data network nodes can be disabled via topology discovery control flags associated with individual physical communications ports of the data switching node. Unknown destination flood data traffic is not replicated to physical communications ports having topology discovery disabled or specifying the suppression of replication of such unknown destination data traffic thereto. The advantages are derived from a data switching node being enabled to operate concurrently in friendly and hostile environments while detecting, preventing and reporting incidences of hostile MAC ADDR attacks.

20 Claims, 3 Drawing Sheets

FIG. 4A

| Global Controls | |
|---|---|
| Topology Discovery | Enable |
| Unknown Destination Flood Suppresion | Disable |

| Global Controls | |
|---|---|
| MAC ADDR Attack Protection | Enable |

| Entry # | Routing Entry Protection Status | Source MAC Address | Physical Port ID |
|---|---|---|---|
| 0 | unProtected | X | 1 |
| 1 | Protected | Y | 2 |
| 2 | unProtected | W | 3 |
| 3 | Protected | Z | 3 |
| ... | ... | ... | ... |

↳ 200

(202 arrows pointing to rows)

FIG. 3

| Physical Port ID | Topology Discovery | Unknown Destination Flood Suppression |
|---|---|---|
| 1 | Enabled | Enabled |
| 2 | Enabled | Disabled |
| 3 | Disabled | Enabled |
| ... | ... | ... |
| N | | |

↳ 300

DATA NETWORK NODE HAVING ENHANCED SECURITY FEATURES

FIELD OF THE INVENTION

The invention relates to data switching in a data transport network and in particular to methods and apparatus providing enhanced networking security.

BACKGROUND OF THE INVENTION

In conveying data over data transport networks, data switching nodes are used to direct the flow of data traffic over interconnecting data links. Each data link is connected to a data switching node via a physical communications port having a port identifier.

The data to be conveyed is typically divided into Payload Data Units (PDUs) such as data packets, frames, cells, etc. Each PDU includes routing information and a payload. The routing information is typically held in a PDU header. For example the routing information includes Media Access Control ADDResses (MAC ADDRs). MAC ADDRs are unique and are associated with data network interfacing equipment associated with data network nodes. An example network interfacing equipment is a Network Interface Card (NIC). Therefore a MAC ADDR is said to represent a data network node identifier. MAC ADDR instances in the routing information are associated with what are known as Source and Destination Addresses.

Data switching nodes make use of the MAC ADDR information for dynamic topology discovery of connected data network nodes and to forward data traffic to particular destination MAC ADDRs. Such a data switching node maintains a switching database and is said to perform "Layer 2 switching". Layer 2 refers to the Open Systems Interconnection (OSI) protocol stack, which specification is well known in the art of data switching and transport, and is included herein by reference.

An exemplary implementation of a switching database is a table having switching database entries, each entry specifying an association between a MAC ADDR and Port IDentifier (PortID). Any received PDU specifying a MAC ADDRs held in the switching database is switched to the PortID specified in the corresponding database entry.

Without the switching database the data switching node behaves like a hub which broadcasts each PDU over all physical communications ports associated therewith except for the physical communications port on which the PDU was received. This broadcast operation is also known as "flooding". Having the switching database reduces the incidence of flooding to instances in which received PDUs bear unknown destination MAC ADDRs not present in the switching database.

In constructing a switching database, process also known as topology discovery, a controller associated with the data switching node extracts the source MAC ADDRs of PDUs received on each physical communications port. If the MAC ADDR:PortID pair is not found in the switching database, the controller creates an entry in the switching database storing the new MAC ADDR:PortID association. This ability to construct the switching database also provides a dynamic discovery of data network nodes recently added to data network segments connected to the data switching node. Dynamically discovering data network nodes and constructing a switching database provides a plug-and-play operation of such data switching equipment otherwise requiring extensive human interaction and absolute knowledge of connected data network nodes in the data transport network.

The plug-and-play operation is often extended to enabling the data switching node to keep track of movement of data network nodes as they connect to different segments of the data transport network associated with the data switching node. The association between the MAC ADDR and PortID is changed in the switching database when a PDU having a MAC ADDR specified in an entry is received from a different physical communications port having a different PortID than the PortID specified therein. In such a case, the new PortID is simply written over the previous PortID specification stored in the entry.

While the plug-and-play functionality reduces human involvement in the discovery of data network nodes in the associated data transport network in the construction and, the reconfiguration of the switching database as data network nodes move in the associated data network, the plug-and-play functionality exposes data network nodes to hostile MAC ADDR attacks. An exposure to a hostile environment exists when the data switching node bridges connectivity between two data transport networks, but is not limited thereto.

For example, in a hostile environment, a hostile data network node may try to spy on the traffic destined to a specific MAC ADDR by taking advantage of the automatic switching database reconfiguration feature of the data switching node.

According to an exemplary scenario, the hostile data network node sends towards the data switching node a data packet having a source MAC ADDR corresponding to the MAC ADDR of the data network node to be attacked. The data switching node registers a data network node move and modifies the switching database entry corresponding to the MAC ADDR by overwriting the PortID specification with the PortID corresponding to the physical communications port with which the hostile data network node is associated. Thereafter, all PDUs destined to the MAC ADDR of the attacked data network node are forwarded by the data switching node to the hostile data network node. The MAC ADDR attack can be as extensive as the hostile data network node taking over the functionality of the attacked data network node. The incident fully complies with the intended operation of currently deployed data switching equipment and would otherwise go undetected.

Therefore, there is a need to enable data switching nodes to operate concurrently in friendly and hostile environments while detecting, preventing and reporting incidences of hostile MAC ADDR attacks.

SUMMARY OF THE INVENTION

In accordance with an aspect of the invention, a secure data switching node is provided. The data switching node maintains a switching database having switching database entries. Each database entry is provided with a corresponding entry protection flag. Each entry protection flag is used to selectively disable the editing of the corresponding database entry and enable the data switching node to operate securely concurrently in friendly and hostile data networking environments.

In accordance with another aspect of the invention, a secure data switching node is provided. The data switching node forwards data traffic between a plurality of physical communications ports and particularly between data network nodes connected to data network segments reachable via physical communications ports. Each physical communications port has an associated Port IDentifier (PortID). A data network topology discovery feature of the data switching node can be disabled on a PortID-by-PortID basis via the use of topology discovery disable flags each of which is associated with a PortID. The topology discovery disable feature prevents hostile data network nodes from participating in the data transport network enabling the data switching node to operate securely concurrently in friendly and hostile data networking environments.

In accordance with a further aspect of the invention, a secure data switching node is provided. When receiving data traffic an having unknown destination, the data switching node forwards the data traffic using a selective flood control mechanism. When the selective flood control mechanism is activated the data traffic is flooded to all physical communications ports except to: the source physical communications port; and PortID having the topology discovery disable feature enabled. The selective flood control mechanism prevents hostile data network nodes from listening to unknown destination data traffic enabling the data switching node to operate securely concurrently in friendly and hostile data networking environments.

The advantages are derived from a data switching node being enabled to operate concurrently in friendly and hostile environments while detecting, preventing and reporting incidences of hostile MAC ADDR attacks.

BRIEF DESCRIPTION OF THE DRAWINGS

The features and advantages of the invention will become more apparent from the following detailed description of the preferred embodiment(s) with reference to the attached diagrams wherein:

FIG. 2 is a schematic diagram showing a detail of a switching database maintained by a data switching node, the switching database having switching database entry protection features in accordance with an exemplary embodiment of the invention;

FIG. 3 is a schematic diagram showing a detail of a switching database maintained by a data switching node, the switching database having control features for each physical communications port in accordance with exemplary embodiments of the invention;

FIG. 4 is a schematic diagram showing control features of the data switching node in accordance with the exemplary embodiment of the invention.

It will be noted that in the diagrams like features bear similar labels.

DETAILED DESCRIPTION OF THE EMBODIMENTS

Figure 1:
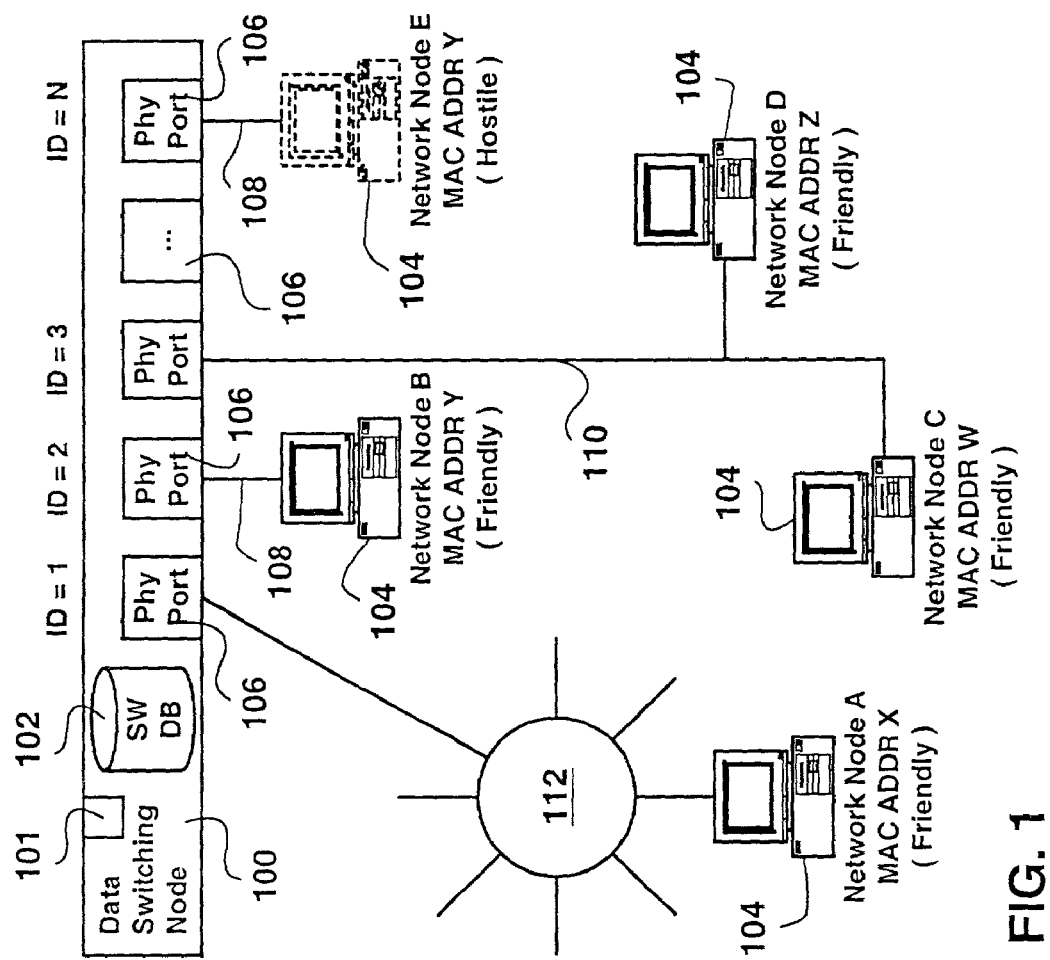
FIG. 1 is a schematic network diagram showing interconnected data network elements operating concurrently in friendly and hostile networking environments.

FIG. 1 is a schematic network diagram showing interconnected data network elements operating concurrently in friendly and hostile data networking environments.

A data switching node 100 having a controller 101 maintains a SWitching DataBase (SW DB) 102. The SW DB 102, described in detail with reference to FIG. 2, FIG. 3 and FIG. 4, stores a current configuration (topology) of data network segments connected to the data switching node 100. The topology information stored in the SW DB 102 specifies which data network node 104 is reachable via which physical port 106. Data network node configurations exist in which more than one data network node 104 is associated with a physical port 106 as data network segments may have more than one data network node.

Individual data network nodes 104 connect to an individual physical communications port 106 via a dedicated communications link such as a network cable 108 as is shown for data network node 104-B. The invention applies equally to: bus-network segments 110, ring-network segments 112, etc. connected to the data switching node 100, as shown in FIG. 1.

The data switching node 100 is shown to operate concurrently in friendly and hostile data networking environments. In particular, data network nodes 104-A having MAC ADDR X, 104-B having MAC ADDR Y, 104-C having MAC ADDR W, etc. are friendly, and data network node 104-E "broadcasting as having" MAC ADDR Y is considered a hostile computer.

FIG. 2 is a schematic diagram showing a detail of a switching database maintained by a data switching node, the switching database having switching database entry protection features in accordance with an exemplary embodiment of the invention.

An exemplary implementation of the SW DB 102 is a look-up table generally depicted at 200. The table 200 contains row switching database entries 202; each entry storing a MAC ADDR, an associated PortID and a switching database entry protection indicator also known as a flag.

As depicted in FIG. 2, table 200 holds the network configuration presented in FIG. 1 where: entry 202-0 corresponds to the data network node 104-A having MAC ADDR X and being connected to physical communications port 106-1, entry 202-1 corresponds to the data network node 104-B having MAC ADDR Y and being connected to physical communications port 106-2, entry 202-2 corresponds to the data network node 104-C having MAC ADDR W and being connected to physical communications port 106-3, entry 202-3 corresponds to the data network node 104-D having MAC ADDR Z and being connected to physical communications port 106-3, etc.

In the art, each entry protection status flag may be referred to as a database entry protection bit. Each entry protection status flag specifies, for example, that the associated switching database entry 202 is protected when the protection bit is set and that the associated entry 202 is unprotected when the protection bit is reset. In particular, FIG. 2 shows the entry protection bit set for entries 202-1 and 202-3. Protected switching database entries having the associated protection bits set cannot be changed—thus locking the association between the MAC ADDR and PortID.

Should the hostile data network node 104-E attempt to send a PDU having MAC ADDR Y on PortID N, controller 101 of the data switching node 100 consults the SW DB 102 and attempts to modify the entry 202-1 corresponding to MAC ADDR Y to change the PortID association from 2 to N. The attempt is prevented by the entry protection bit being set. The failed attempt is detected as a potential intrusion incident and is reported using methods well known in the art such as alert generation and alert dissemination methods.

The switching database entry protection feature is equivalent to and provides security provisions inherent of a manually set switching database entry in an operator provisioned switching table where the association between a data network node and the data switching node is explicitly defined.

The entry protection status flags may be set via a control interface such as a management console. Other methods exist including the loading into the switching database 102 of protected entries form a secure long-term storage such as a hard drive, Electronically (Erasable and) Programmable Read Only Memory E(E)PROM, but not limited thereto.

Should an entry in the SW DB 102 be protected as shown above, it does not prevent other MAC ADDRs from being associated with the same PortID as seen in the entries 202-2 and 202-3. More than one MAC ADDR can be associated with a PortID when the physical communications port 106 of the data switching node 100 is connected to a multi-node data network segment (112, 110).

Typically, only a limited number of entries can be stored due to storage limitations imposed on the table 200. Should a new source MAC ADDR be received at the data switching node 100 having reached its maximum number of entries in the table 200, either the oldest or least used entry is removed from the SW DB 102 to accommodate the new MAC ADDR. The hostile data network node 104-E may attempt to spy on data traffic passing through the data switching node 100 by sending a large number of PDUs having bogus MAC ADDRs which are then learned by the data switching node 100 ultimately discarding legitimate entries in the SW DB 102. This process is known as "flushing" legitimate MAC ADDRs out of the SW DB 102.

Once legitimate routing entries are discarded, PDUs having legitimate MAC ADDRs destinations, corresponding to the discarded routing entries are flooded to all physical communications ports including the physical communications port to which the hostile data network node is connected. Thereby the hostile data network node is able to spy on the data traffic processed by the data switching node 100.

FIG. 3 is a schematic diagram showing a detail of a switching database maintained by a data switching node, the switching database having control features for each physical communications port in accordance with the exemplary embodiment of the invention.

A topology discovery disable feature may be implemented using control bits (or flags), each control bit being associated with a PortID—other implementations are possible and are not limited to the tabular representation 300 shown. When topology discovery is disabled for a particular PortID, such as is done for PortID 3, additional switching database entries associated with the PortID are prevented from being added to the SW DB 102.

For example, topology discovery may be used at network setup and then disabled to prevent further changes to the SW DB 102 associated with a particular PortID. Alarms can be generated should additional source MAC ADDRs be received at the data switching node 100 on the physical communications port having its topology discovery feature disabled.

In accordance with another embodiment of the invention, the topology discovery control may allow MAC ADDRs associated with a physical communications port to be added dynamically up to an upper limit enforced on a per PortID basis thus enabling a controlled amount of discovery but preventing flushing all legitimate entries in the SW DB 102.

An unknown destination flood control feature, also shown may be implemented as a control bit (or flag) per communications port but not limited thereto. When the control bit is set, the unknown destination flood control feature is enabled and disabled when the control bit is reset.

The unknown destination flood control feature is used to prevent the replication of PDU to selected communication ports. The feature prevents hostile data network nodes connecting to the selected communications ports from listening to unknown destination data traffic.

FIG. 4 is a schematic diagram showing control features of the data switching node in accordance with other exemplary implementations of the invention.

In accordance with another implementation of the invention control features have a global scope enforcing security resources for all physical communications ports of the data switching node.

The global control features are generally shown at 400 including a global typology discovery control bit. When the global typology discovery control bit is set to no switching database entries may be added to the SW DB 102 automatically.

Of course switching database entries added via a management console are not affected. When the global typology discovery control bit is reset, typology discovery control is enforced on a port-by-port basis as shown above.

A global unknown destination flood control feature also shown in FIG. 4A is used in conjunction with the topology discovery disable feature and provides the following advantage.

Having discovered all data network nodes connected to a particular physical port it is unnecessary to flood unknown destination PDUs to that communications port because all data network nodes connected thereto are known. This reduces the amount of PDU processing in replicating such PDUs to physical communications ports.

In accordance with yet another implementation of the invention all control features presented above may be activated via a single control bit as shown in FIG. 4.

Figure 5:
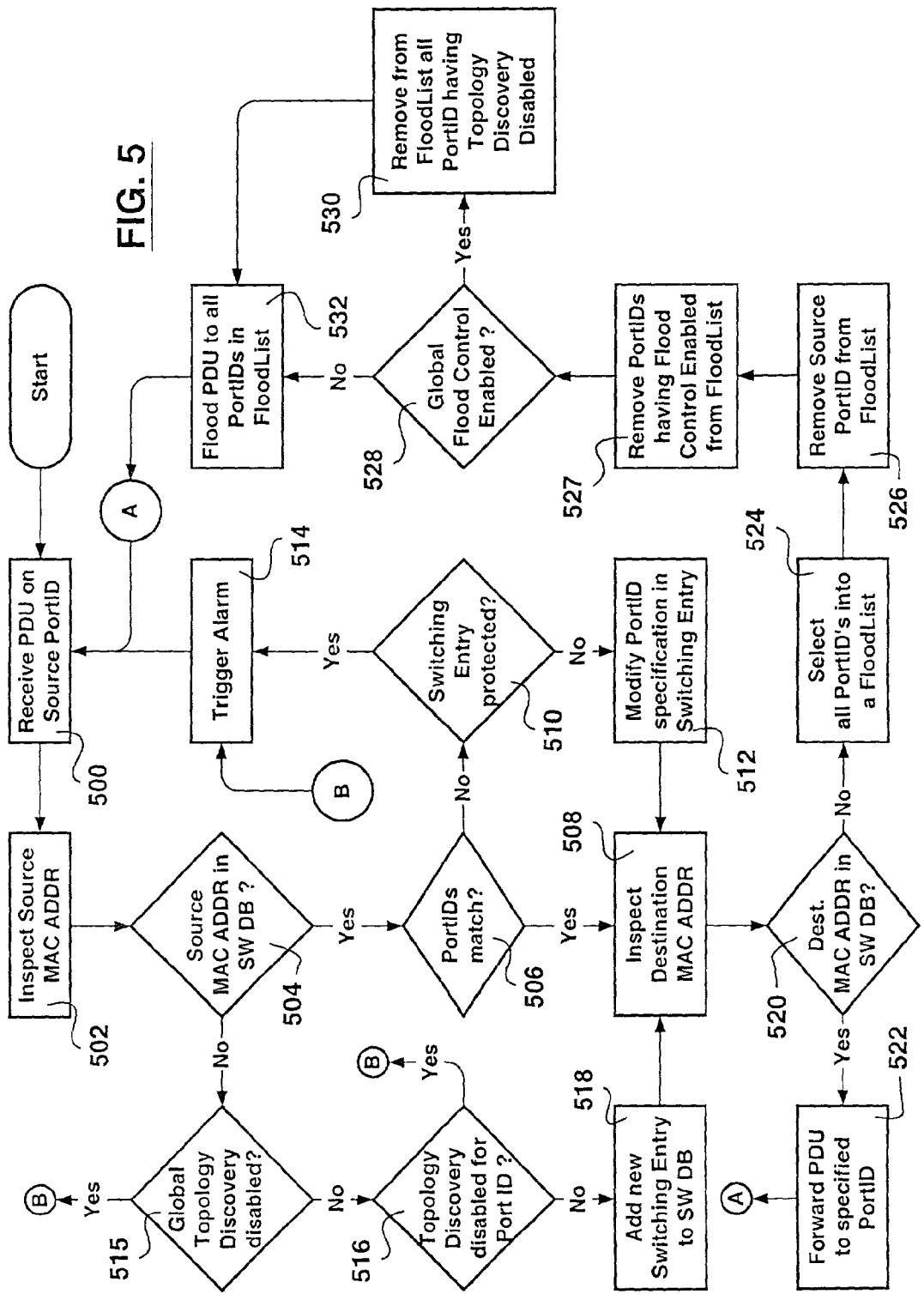
FIG. 5 is a flow diagram showing a secure PDU forwarding process implementing MAC ADDR attack detection, prevention and reporting at a data switching node in accordance with the exemplary embodiment of the invention.

FIG. 5 is a flow diagram showing a secure PDU forwarding process implementing MAC ADDR attack detection, prevention and reporting at a data switching node in accordance with the exemplary embodiment of the invention.

The secure PDU forwarding process is started in step 500 by receiving a PDU from a source physical communications port having a source PortID. The controller 101 associated with the data switching node 100 inspects the header of the received PDU for routing information, extracting at least a source MAC ADDR in step 502. The SW DB 102 is queried based on the source MAC ADDR in step 504.

If a switching database entry corresponding to the source MAC ADDR is found in the SW DB 102 in step 504, the process proceeds, in step 506, with determining whether the PortID stored in the entry and the source PortID match.

If the PortIDs match in step 506, the process proceeds with forwarding the PDU from step 508.

If the PortIDs do not match in step 506, the process proceeds by attempting to modify the switching database entry in step 512 if the entry is not protected, fact ascertained in step 510.

If the switching entry is not found to be protected in step 510, the entry is modified in step 512 and the process proceeds from step 508 with forwarding the PDU.

If the switching entry is found to be protected in step 510, the process proceeds from step 514, triggering an alarm. The process continues by discarding the PDU and resuming from step 500.

If a switching database entry corresponding to the source MAC ADDR is not found in the SW DB 102 in step 504, the process attempts to add a new entry to the SW DB 102 subject to whether topology discovery is suppressed for the source PortID which is enforced in steps 515 and 516.

If topology discovery is disabled globally for the entire data switching node 100, then the process resumes from step 514 by triggering an alarm; otherwise topology discovery control is enforced for the source PortID.

If topology discovery is enabled for the source PortID in step 516, a new entry to the SW DB 102 is added in step 518 and the process continues from step 508 with forwarding the PDU.

If topology discovery is suppressed for the source PortID in step 516, the process resumes from step 514 by triggering an alarm.

In forwarding the PDU, the controller 101 inspects the PDU routing information extracting at least the destination MAC ADDR. The process queries the SW DB 102 based on the destination MAC ADDR in step 520.

If the SW DB 102 contains a switching entry corresponding to the destination MAC ADDR, then the PDU is forwarded to the PortID specified in that entry in step 522. Subsequent to forwarding the PDU in step 522, the process resumes from step 500.

If the SW DB 102 does not contain a switching entry corresponding to the destination MAC ADDR, then a port flood list containing all physical communications ports is generated in step 524 and the source PortID is removed therefrom in step 526. In step 527, all PortID's having the port unknown destination flood control bit set are also removed from the port flood list.

Subject to the global unknown destination flood control feature being activated, fact ascertained in step 528 the PDU is replicated and flooded to physical communications ports in the port flood list in step 532.

If the global unknown destination flood control feature is enabled, all ports having topology discovery disabled are removed from the port flood list in step 530 prior to flooding all physical communications ports in step 532.

Subsequent to flooding the PDU to all ports in the remaining flood list, the process resumes from step 500.

The embodiment presented is exemplary only and persons skilled in the art would appreciate that variations to the above-described embodiment may be made without departing from the spirit of the invention—the scope of the invention being solely defined by the appended claims.

We claim:

1. A secure data switching node comprising:
  a. a plurality of communications ports;
  b. a switching database having a plurality of switching entries, each one of the plurality of switching entries specifying an association between one or more data network node identifiers and one or more respective communications ports;
  c. a plurality of switching entry protection flags, corresponding to the plurality of switching entries, each of the plurality of switching entry protection flags configured with a predetermined value that determines whether each of the switching entries is protected from update; and
  d. a controller executing a secure switching database update process, for at least one of the switching entries, wherein executing a secure switching database update process includes determining, from at least one of the switching entry protection flags, whether the at least one of the switching entries is protected from update and receiving a modification instruction including a change of at least one of the respective communications ports for at least one of the data network node identifiers, whereby an attempt by a hostile data network node to effect a modification of the at least one communication port of a protected switching entry is prevented when the protection flag is set, enabling the data switching node to operate securely concurrently in friendly and hostile data networking environments.

2. A secure data switching node as claimed in claim 1, wherein the communication ports are represented in the switching entries via port identifiers.

3. The secure data switching node of claim 1, further comprising an alarm configured for trigger if at least one of the switching entries is protected from update.

4. A secure data switching node comprising:
  a. a plurality of physical communications ports;
  b. a switching database having a plurality of switching entries, each one of the plurality of switching entries specifying an association between one or more data network node identifiers and one or more of the respective physical communications ports;
  c. a plurality of topology discovery disable flags corresponding to the plurality of switching entries, each of the plurality of topology discovery disable flags configured with a predetermined value that determines whether additional switching entries are prevented from being added to the switching database; and
  d. a controller executing a secure data transport network topology update process for at least one of the switching entries, wherein executing a secure data transport network topology update includes determining, from at least one of the topology discovery disable flags, whether switching entries are prevented from being added to the switching database and receiving an addition instruction including a change of at least one of the respective communications ports for at least one of the data network node identifiers, whereby attempts by a hostile data network node to effect at least one addition of a switching entry specifying a communications port associated with a topology discovery disabled physical communications port are prevented, enabling the data switching node to operate securely concurrently in friendly and hostile data networking environments.

5. The secure data switching node of claim 4, further comprising an alarm configured for trigger if switching entries are prevented from being added to the switching database.

6. A secure data switching node comprising:
  a. a plurality of physical communications ports;
  b. a switching database having a plurality of switching entries, each one of the plurality of switching entries specifying an association between a data network node identifier and a communications port;
  c. a plurality of topology discovery disable flags, corresponding to the plurality of switching entries, each of the plurality of topology discovery disable flags configured with a predetermined value that determines whether additional switching entries are prevented from being added to the switching database;
  d. a global unknown destination flood control flag; and
  e. a controller implementing a secure Payload Data Unit (PDU) forwarding process, the PDU forwarding process including a modification instruction including a change of at least one communication port for at least one of the data network node identifiers, a received PDU having a destination data node identifier not stored in the switching database is replicated only to physical communications ports having reset topology discovery disable flags preventing hostile data network nodes connected thereto from listening to unknown destination data traffic, wherein implementing a secure Payload Data Unit (PDU) forwarding process includes determining, from at least one of the topology discovery disable flags, whether switching entries are prevented from being added to the switching database.

7. The secure data switching node of claim 6, further comprising an alarm configured for trigger if switching entries are prevented from being added to the switching database.

8. A secure data switching node comprising:
   a. a plurality of physical communications ports;
   b. a switching database having a plurality of switching entries, each one of the plurality of switching entries specifying an association between at least one data network node identifier and at least one of the communications ports;
   c. a plurality of unknown destination flood control flags, corresponding to the plurality of switching entries, each of the plurality of unknown destination flood control flags configured with a predetermined value that determines whether replication of Payload Data Unit (PDU) to communication ports is prevented; and
   d. a controller implementing a secure Payload Data Unit (PDU) forwarding process, wherein implementing a secure Payload Data Unit (PDU) forwarding process includes determining, from at least one of the unknown destination flood control flags, whether replication of PDU to communication ports is prevented, the PDU forwarding process further including receiving a modification instruction including a change of at least one of the communication ports for at least one of the data network node identifiers, whereby a received PDU having as a destination data node identifier not stored in the switching database is replicated only to physical communications ports having reset unknown destination flood control flags preventing hostile data network nodes connected thereto from listening to unknown destination data traffic.

9. The secure data switching node of claim 8, further comprising an alarm configured for trigger if replication of PDU to communication ports is prevented.

10. A method of securely updating a switching database of a data switching node forwarding data traffic in a data transport network, the method comprising steps of:
   a. extracting a source data network node identifier from data traffic received on a source physical communications port of the data switching node;
   b. querying the switching database having a plurality of switching entries, each one of the plurality of switching entries specifying an association between a data network node identifier and a communications port, the query using the extracted source data network identifier as a key, the switching database including a field for indicating a predetermined value associated with the source data network node identifier configured to indicate whether a new switching entry is prevented from being added to the switching database;
   c. receiving a modification instruction including a change of the communication port for the data network node identifier;
   d. adding a new switching entry to the switching database if a switching entry corresponding to the source data network node identifier does not prevent entry to the switching database; and
   e. modifying the communications port specification of a switching entry found to correspond to the extracted source data network node identifier, if a switching entry protection flag associated with the found switching entry is reset whereby preventing a redirection of data traffic processed by the data switching node.

11. The method of claim 10, further comprising triggering an alarm if switching entries are prevented from being added to the switching database.

12. A method of securely updating data transport network topology information held in a switching database of a data switching node associated with the data transport network, the method comprising steps of:
   a. extracting a source data network node identifier from data traffic received on a source physical communications port of the data switching node;
   b. querying the switching database having a plurality of switching entries, each one of the plurality of switching entries specifying an association between a data network node identifier and a communications port, the query using the extracted source data network node identifier as a key, the switching database including a field for indicating a predetermined value associated with a topology discovery disable flag configured to indicate whether switching entries are prevented from being added to the switching database; and
   c. receiving a modification instruction including a change of the communication port for the data network node identifier;
   d. adding a new switching entry to the switching database if a switching entry corresponding to the source data network node identifier is not found in the switching database and the topology discovery disable flag is reset whereby a hostile data network node is prevented from connecting to the source physical communications port.

13. A method as claimed in claimed in claim 12, wherein the topology discovery disable flag is associated with the source communications port.

14. A method as claimed in claimed in claim 12, wherein the topology discovery disable flag is associated with all physical communications ports of the data switching node.

15. The method of claim 12, further comprising triggering an alarm if switching entries are prevented from being added to the switching database.

16. A secure method of forwarding data traffic having a destination unknown to a data switching node, the method comprising steps of:
   a. extracting a source data network node identifier from the unknown destination data traffic received on a source physical communications port of the data switching node;
   b. querying the switching database having a plurality of switching entries each one of the plurality of switching entries specifying an association between a data network node identifier and a communications port, the query using the extracted source data network node identifier as a key, the switching database including a field for indicating a predetermined value associated with a global unknown destination flood control flag configured to indicate whether replication of PDU to communication ports is prevented;
   c. receiving a modification instruction including a change of the communication port for the data network node identifier;
   d. replicating the received data traffic to each one of a plurality of physical communications ports of the data switching node if the global unknown destination flood control flag associated with the data switching node is reset; and
   e. replicating the received data traffic to each one of the plurality of physical communications ports except physical communications ports having a topology discovery disable feature set if the global unknown destination flood control flag is set whereby a hostile data network node connected to a physical communications port having the topology discovery disable flag set is prevented from spying on unknown destination data traffic.

17. A method as claimed in claim 16, wherein replicating the unknown destination data traffic, the method further comprises a step of suppressing the replications of the data traffic to the source communications port.

18. A method as claimed in claim 16, wherein each physical communications port further includes an associated unknown destination flood control bit, the method further comprising a step of: suppressing the replication of the data traffic to communications ports having the associated unknown destination flood control bit set.

19. A secure method of forwarding data traffic having a destination unknown to a data switching node, the method comprising steps of:
   a. extracting a source data network node identifier from the unknown destination data traffic received on a source physical communications port of the data switching node;
   b. querying the switching database having a plurality of switching entries each one of the plurality of switching entries specifying an association between a data network node identifier and a communications port, the query using the extracted source data network node identifier as a key, the switching database including a field for indicating a predetermined value associated with an unknown destination flood control flag configured to indicate whether replication of PDU to communication ports is prevented;
   c. receiving a modification instruction including a change of the communication port for the data network node identifier;
   d. replicating the received data traffic to each one of a plurality of communications ports of the data switching node if the unknown destination flood control flags associated with the physical communications ports are reset; and
   d. replicating the received data traffic to each one of the plurality of physical communications ports except physical communications ports having the unknown destination flood control flag set, whereby a hostile data network node connected to a physical communications port having the associated topology discovery disable flag set is prevented from spying on unknown destination data traffic.

20. A method as claimed in claim 19, wherein replicating the unknown destination data traffic, the method further comprises a step of suppressing the replication of the data traffic to the source communications port.

* * * * *